(12) United States Patent
Cummings

(10) Patent No.: US 9,380,683 B2
(45) Date of Patent: Jun. 28, 2016

(54) LAMP DIMMER SYSTEM

(71) Applicant: Eugene M. Cummings, Lake Forest, IL (US)

(72) Inventor: Eugene M. Cummings, Lake Forest, IL (US)

(*) Notice: Subject to any disclaimer, the term of this patent is extended or adjusted under 35 U.S.C. 154(b) by 11 days.

(21) Appl. No.: 13/835,425

(22) Filed: Mar. 15, 2013

(65) Prior Publication Data

US 2014/0265918 A1  Sep. 18, 2014

(51) Int. Cl.
*H05B 37/02* (2006.01)

(52) U.S. Cl.
CPC ............ *H05B 37/0272* (2013.01); *Y02B 20/42* (2013.01)

(58) Field of Classification Search
CPC ... H05B 37/029; H05B 37/02; H05B 37/0272
USPC .................. 315/291–295, 297, 307, 312–318
See application file for complete search history.

(56) References Cited

U.S. PATENT DOCUMENTS

| | | | | |
|---|---|---|---|---|
| 5,731,664 | A * | 3/1998 | Posa | 315/194 |
| RE38,069 | E * | 4/2003 | Posa | 315/194 |
| 2005/0040772 | A1* | 2/2005 | Guzman et al. | 315/291 |
| 2006/0284734 | A1* | 12/2006 | Newman, Jr. | 340/825 |
| 2008/0136663 | A1* | 6/2008 | Courtney et al. | 340/825.22 |
| 2008/0303451 | A1* | 12/2008 | Mosebrook et al. | 315/291 |
| 2009/0206769 | A1* | 8/2009 | Biery et al. | 315/291 |
| 2010/0320922 | A1* | 12/2010 | Palazzol et al. | 315/210 |
| 2011/0133668 | A1* | 6/2011 | Rix et al. | 315/294 |
| 2012/0056712 | A1* | 3/2012 | Knode | 340/3.7 |

* cited by examiner

*Primary Examiner* — Jason M Crawford
(74) *Attorney, Agent, or Firm* — Law Offices of Eugene M. Cummings, P.C.

(57) ABSTRACT

A lamp dimmer system for dimming multiple lamps in a room having unswitched receptacles, and switched receptacles under control of a single wall switch. A user control module connected to an unswitched receptacle transmits momentary wireless brightness command signals in response to user-actuation of a brightness control. Each lamp in the room includes a lamp control module connected to both the unswitched and switched receptacles and to the lamp. The lamp control modules include a receiver which receives the brightness command signals and a control circuit which generates a steady state brightness control signal in response to the momentary command signals. A dimmer circuit responsive to the brightness control signal, and connected between the unswitched receptacle and the lamp, controls the power supplied to the lamp according to the level of the brightness control signal. An AC detector circuit within the lamp control module and connected to the switched receptacle conditions the dimmer circuit to full brightness upon the wall switch being switched on, and to minimum brightness upon the wall switch being switched off, thereby enabling normal operation of lamps by the wall switch.

1 Claim, 4 Drawing Sheets

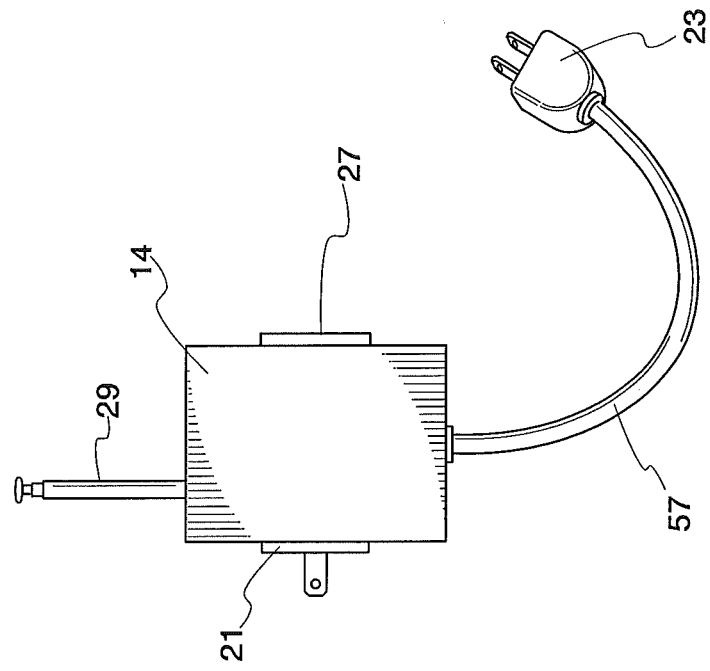
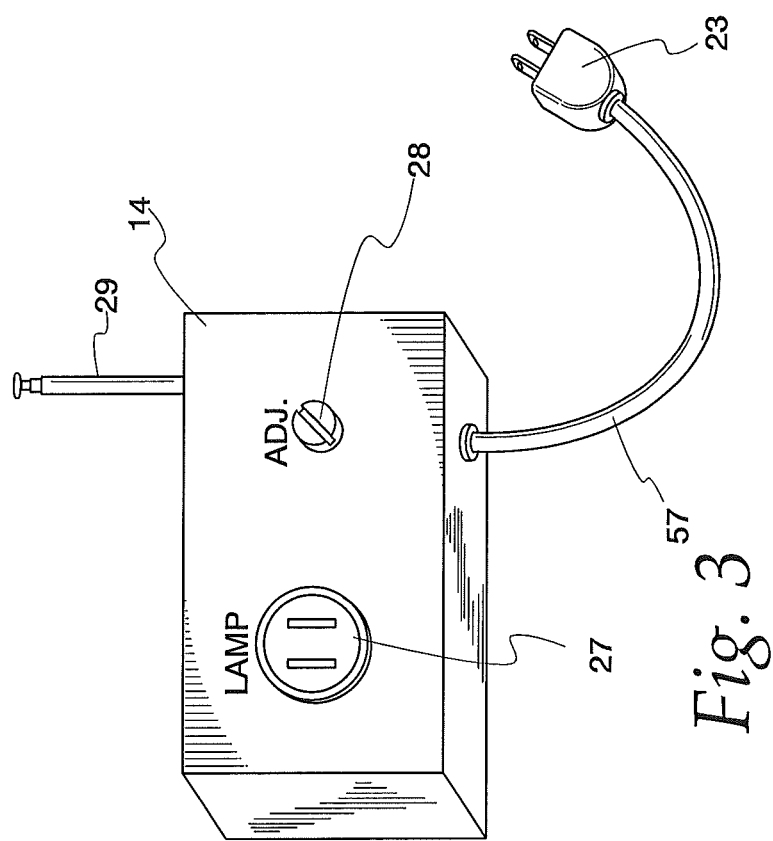

LAMP DIMMER SYSTEM

BACKGROUND OF THE INVENTION

It is frequently desirable to dim one or more table lamps within a room from a single location, such as the table beside a bed. In the past, various dimming arrangements have been provided, including a user-operated rheostat, from which the lamps to be dimmed are powered. While this provides convenient dimming of the lamps from bedside, it has the drawback of requiring power cables connecting each lamp to the rheostat, and the further disadvantage of not allowing control of the lamps from the wall switch. Consequently, there is no way to extinguish the lamps conveniently while leaving the room, nor is there any convenient way to power-up the lamps upon entering the room.

The present invention provides a system wherein multiple lamps can be dimmed from the bedside location without the need of wires running to each lamp from the controller, and enables the lamps to be switched on or off in a conventional manner by the wall switch.

SUMMARY OF THE INVENTION

A lamp brightness control system is provided for controlling from one location one or more dimmable lamps at another location, in a room having one or more unswitched electrical outlets, and one or more switched electrical outlets under control of at least one wall switch for supplying power to the lamps. The system comprises a user control module at the one location for producing a user brightness command signal. A transmitter at the one location is provided for transmitting the user brightness command signal. A receiver at the other location is provided for receiving the transmitted user brightness command signal. A control circuit at the other location responsive to the user brightness command signal generates a brightness control signal having a minimum level corresponding to a minimum desired lamp brightness level, and a maximum level corresponding to a maximum desired lamp brightness level. The control circuit, upon receiving the user brightness command signal, sets the brightness control signal to a level corresponding to the user-desired lamp brightness. A power detector circuit at the other location is connected to the switched outlet for producing a first brightness override signal upon the switched outlet becoming powered and a second brightness override signal upon the switched outlet becoming unpowered. The control circuit is responsive to occurrence of the first brightness override signal to reset the brightness control signal to its maximum level, and is responsive to occurrence of the second brightness override signal to reset the brightness control signal to its minimum level. A dimmer circuit at the other location is connected between the unswitched receptacle and the lamp, and is responsive to the brightness control signal to set the lamp to the user desired brightness level upon occurrence of the user brightness command signal, to its maximum brightness level upon closure of the wall switch, and to its minimum brightness level upon opening of the wall switch.

BRIEF DESCRIPTION OF THE DRAWINGS

The present invention will be apparent to those skilled in the art by reading the following detailed description of a preferred embodiment thereof, with reference to the attached drawings, in which:

FIG. 3 is a perspective view of a lamp control module constructed in accordance with the disclosure, which includes an integral AC plug for insertion into the non-switched receptacle and a cord-connected plug for insertion into a switched receptacle.

FIG. 4 is a side elevational view of the lamp control module of FIG. 3.

DETAILED DESCRIPTION OF THE PREFERRED EMBODIMENT

Figure 1:
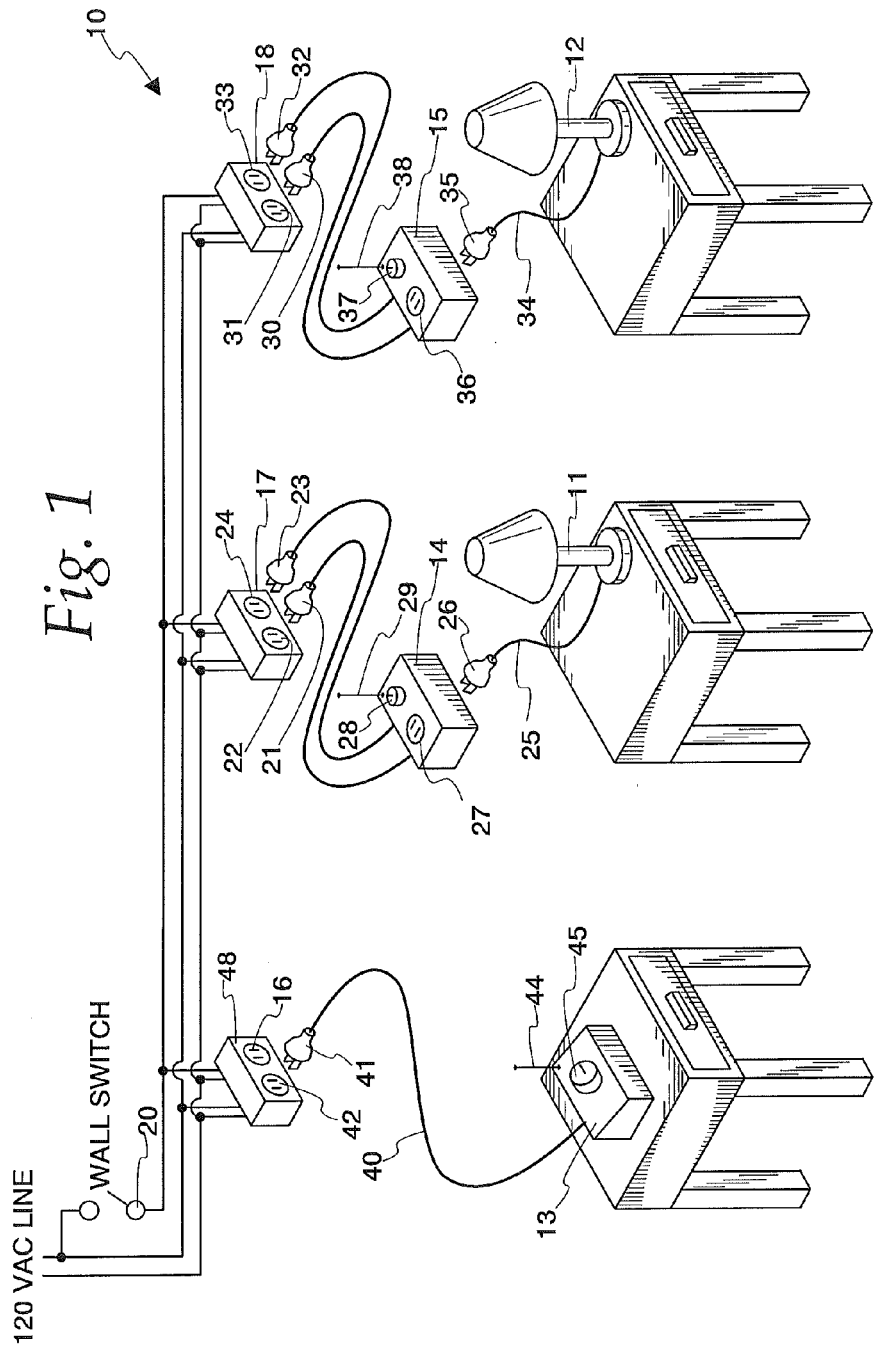
FIG. 1 is a simplified perspective view of a lamp control system constructed in accordance with the disclosure, wherein two lamps at one location are each provided with a lamp control module responsive to wireless signals from a single user control module at another location.

A lamp dimmer system 10 constructed in accordance with the preferred embodiment is provided, for example, in a bedroom, for controlling the brightness of two table lamps 11 and 12 at one location from a bedside user control module 13 at another location. Table lamp 11 has an associated lamp control module 14 and table lamp 12 has an associated lamp control module 15. Power is supplied to the user control module 13 by one receptacle of a conventional duplex AC outlet 16, and power is supplied to lamp control modules 14 and 15 from conventional duplex outlets 17 and 18, respectively.

In accordance with conventional practice in bedrooms and other rooms illuminated primarily by table and floor lamps, at least a portion of the outlets in the room contain one receptacle which is unswitched and another receptacle which is switched. In the present embodiment, the left receptacle in each duplex outlet is unswitched and connected directly to the 120-volt AC line, and the right receptacle in each duplex outlet is connected through a single conventional wall switch 20 to the AC line. Thus, the left side receptacle of each outlet is always powered and the right side receptacle of each outlet is powered only when wall switch 20 is closed.

Lamp control module 14 includes a first conventional AC plug 21 and associated power cord which connects in a conventional manner to the unswitched left receptacle 22 of outlet 17, and a second conventional AC plug 23 and associated power cord which connects to the switched right receptacle 24 of outlet 17. Table lamp 11 includes a conventional power cord 25 and AC plug 26 which connects to a receptacle 27 provided on the housing of lamp control module 14. A slotted rotary adjustment knob 28 and an external antenna 29 are also provided on the housing of lamp control module 14.

Similarly, lamp control module 15 includes a conventional AC plug 30 and associated power cord which connects to a conventional unswitched left receptacle 31 of outlet 18, and a second conventional AC plug 32 and associated power cord which connects to a conventional switched right receptacle 33 of outlet 18. Table lamp 12 includes a conventional power cord 34 and AC plug 35 which connects to a conventional receptacle 36 on the housing of lamp control module 15. A slotted adjustment knob 37 and external antenna 38 are also provided on the housing of lamp control module 15.

The user control module 13 includes a conventional power cord 40 and AC plug 41 which connect to the unswitched left receptacle 42 of outlet 16. In the present embodiment, the switched right receptacle 43 of outlet 16 is not utilized. An external antenna 44 may be provided on the housing of user control module 13.

In operation, user control lamp dimmer module 13 receives AC power from receptacle 42, irrespective of the position of wall switch 20. Similarly, lamp control module 14 receives AC power from unswitched receptacle 22, and lamp control module 15 receives AC power from receptacle 31. Table lamp 11 receives power from receptacle 27 of lamp control module 14 at a level set by circuitry within the control module. Similarly, table lamp 12 receives AC power from receptacle 36 of lamp control module 15 at a level set by circuitry within the module.

The brightness of table lamps 11 and 12 is controlled by user-actuation of a knob 45 on the housing of user control module 13. Actuation of this knob causes circuitry within the module to generate an RF brightness command signal which is radiated by antenna 44 and received by antenna 29 of lamp control module 14 and by antenna 38 of lamp control module 15. Within lamp control module 14 the power supplied from receptacle 22 through lamp control module 14 and receptacle 27 to the lamp is set according to the brightness command signal received on antenna 29. Similarly, the power supplied to table lamp 12 from receptacle 31 through lamp control module 15 and receptacle 36 is set according to the brightness command signal. Thus, the brightness of both lamps is set with user rotation of knob 45.

To allow the user to turn off table lamps 11 and 12 when exiting the room and turn the lamps on when entering the room, lamp control modules 14 and 15 monitor the power status of unswitched receptacles 24 and 33, respectively. In particular, AC detection circuitry within lamp control module 14 senses by means of AC plug 23 the sudden interruption of voltage on receptacle 24, as when switch 20 is switched off upon the user exiting the room, which causes the lamp dimming circuitry contained within the module to reset to a minimum brightness on off state. Conversely, upon sensing a sudden restoration of AC voltage at receptacle 24, as when the switch 20 is switched on when the user enters the room, the lamp dimmer circuitry within module 14 is reset to maximum brightness. Thus, notwithstanding the current brightness level established by user control module 13, wall switch 20 is able to override the brightness setting established by user control module 13 and set the lamps to full brightness.

Similarly, lamp control module 15 includes an AC detection circuit which senses by means of AC plug 32 the sudden interruption of power at switched receptacle 33 when switch 20 is opened, and resets table lamp 12 to off, and resets lamp 12 to full brightness upon switch 20 being closed and power being restored to receptacle 33.

Figure 2:
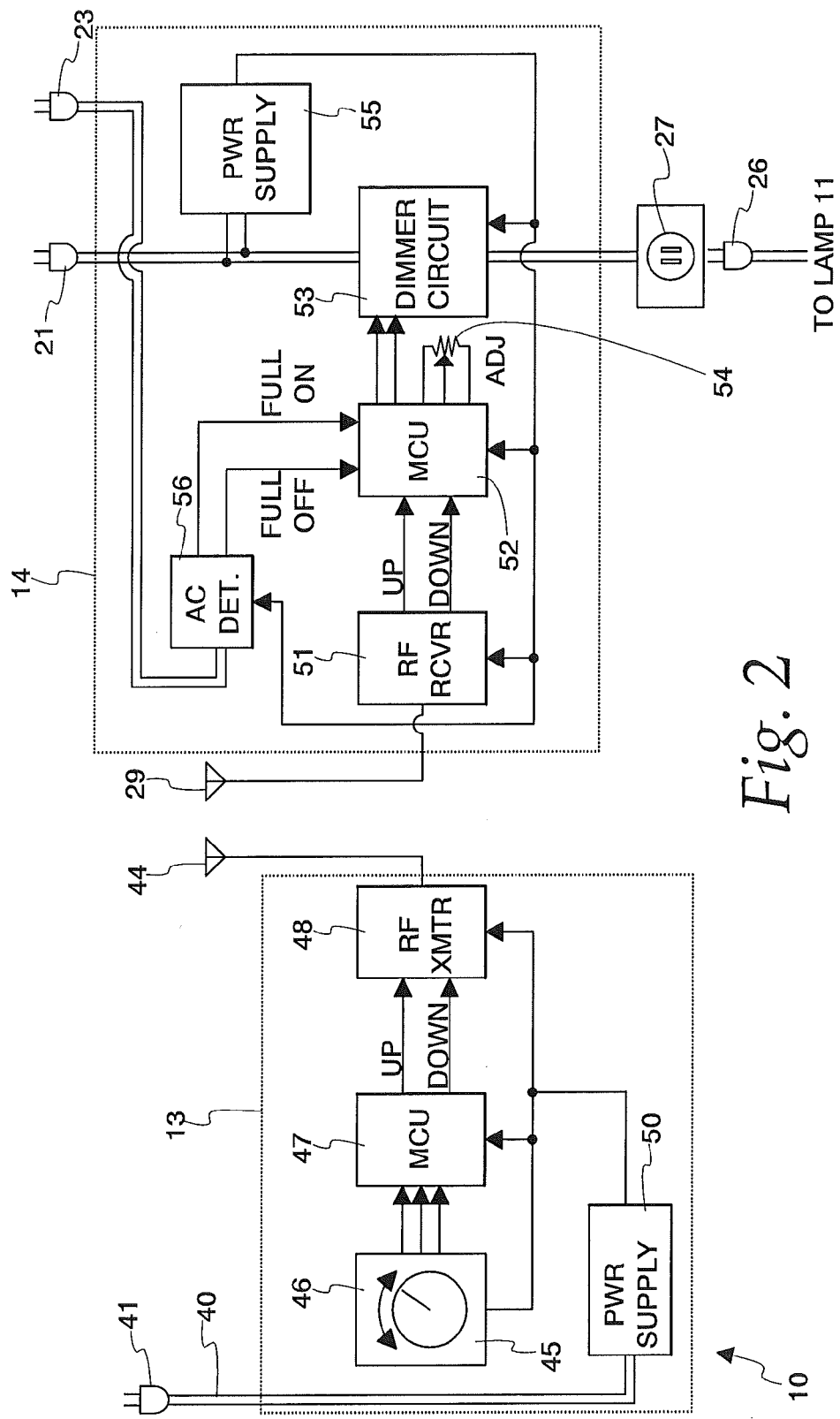
FIG. 2 is a simplified schematic diagram, partially in functional block form, of a lamp dimmer system constructed in accordance with the embodiment, wherein brightness increase and decrease command signals are generated by a single user control module and transmitted to the lamp control module wherein a steady state brightness control signal generated from the command signals is applied to a dimmer circuit to control lamp brightness.

The structure and function of lamp dimmer system 10 is shown in greater detail in FIG. 2. User control module 13 is seen to include a rotary encoder 46 which produces a quadrature signal in response to the movement of knob 45. This quadrature signal is received by a microcontroller 47 which converts the quadrature signal to up and down brightness command signals, depending on whether the user is rotating knob 45 clockwise to increase brightness, or counter-clockwise to decrease brightness. The up and down signals are received by an RF transmitter circuit 48, which produces corresponding momentary RF output signals for radiation by antenna 44. A power supply 50 within user control module 13 receives power through AC plug 41 and power cord 40 to supply the components of the module.

The momentary up and down RF command signals generated by transmitter 48 are received at antenna 29 and applied to an RF receiver circuit 51 within lamp control module 14. Receiver circuit 51 converts the RF signals to up and down command signals which are applied to a microcontroller 52 within the module. Microcontroller 52 functions to maintain a steady state brightness control output signal which is increased with the occurrence of up command signals and decreased with the occurrence of down command signals. This brightness control signal is applied to a dimmer circuit 53 which varies the current applied from AC plug 21 to the lamp receptacle 27 in accordance with the level of the command signal. With recurrent up commands, the steady state brightness control signal increases and the power supplied to receptacle 27 increases. Conversely, with recurrent down commands, the brightness control signal decreases and less power is supplied to receptacle 27, and hence lamp 11. The amplitude of the brightness control signal generated by microcontroller 52 can be adjusted by means of a potentiometer 54 coupled to the slot adjustment knob 28 (FIG. 1) to accommodate the operating characteristics of the bulbs being controlled.

Lamp control module 14 further includes a power supply 55 which receives power from an unswitched receptacle by way of AC plug 21 to supply DC operating current to the various components of the module.

To provide for the normal functioning of wall switch 20 (FIG. 1), lamp control module 14 further includes an AC detector circuit 56 which receives switched AC current by means of AC plug 23. Upon wall switch 20 being closed and power appearing on plug 23, AC detector circuit 56 provides a momentary full-on output signal which is applied to microcontroller 52 to immediately raise the brightness control signal generated by the microcontroller signal to a maximum level, causing dimmer circuit 53 to supply essentially full current to receptacle 27 and lamp 11. Conversely, when wall switch 20 is actuated open, a momentary full off outlet signal from AC detector circuit 56 is applied to microcontroller 52 to cause the controller to immediately reduce the brightness control signal to a minimum level, essentially causing dimmer circuit 53 to interrupt current to receptacle 27 and lamp 11.

In this way, lamp control system 10 enables a user to actuate knob 45 at user control module 13 to selectively brighten or dim table lamp 11. Yet, upon exiting the room, the user can actuate wall switch 20 (FIG. 1) to an off position and table lamp 11 is extinguished. Subsequently, upon entering the room, the user can actuate wall switch 20 to an on position and lamp 11 is immediately switched on to full brightness. In the event that wall switch 20 is open at the time the user uses user module 13 to actuate the lamp to a selected brightness level, and then upon exiting the room desires to fully extinguish the lamp, it is only necessary for the user to momentarily actuate wall switch 20 to on and then set the switch to off, and microcontroller 52 will respond by setting the brightness control signal to a minimum level thereby causing dimmer circuit 53 to extinguish the lamp.

Referring to FIGS. 3 and 4, lamp control module 14 may include a housing wherein AC plug 21 is mounted on the surface of the housing such that when the plug is inserted into the unswitched receptacle 22 (FIG. 1) of outlet 17, the housing is supported by the plug, which keeps it off the floor and renders receptacle 27 conveniently situated for receiving the AC plug 26 of table lamp 11. The plug 21 may be mounted to the housing so as to enable limited rotation of the plug to align its connecting pins with receptacle 22. The AC sensing plug 23 may be conveniently connected to circuitry within the housing by a short cable 57 and inserted into the adjacent switched receptacle 24 of outlet 17 to sense changes in the state of wall switch 20 (FIG. 1).

Figure 5:
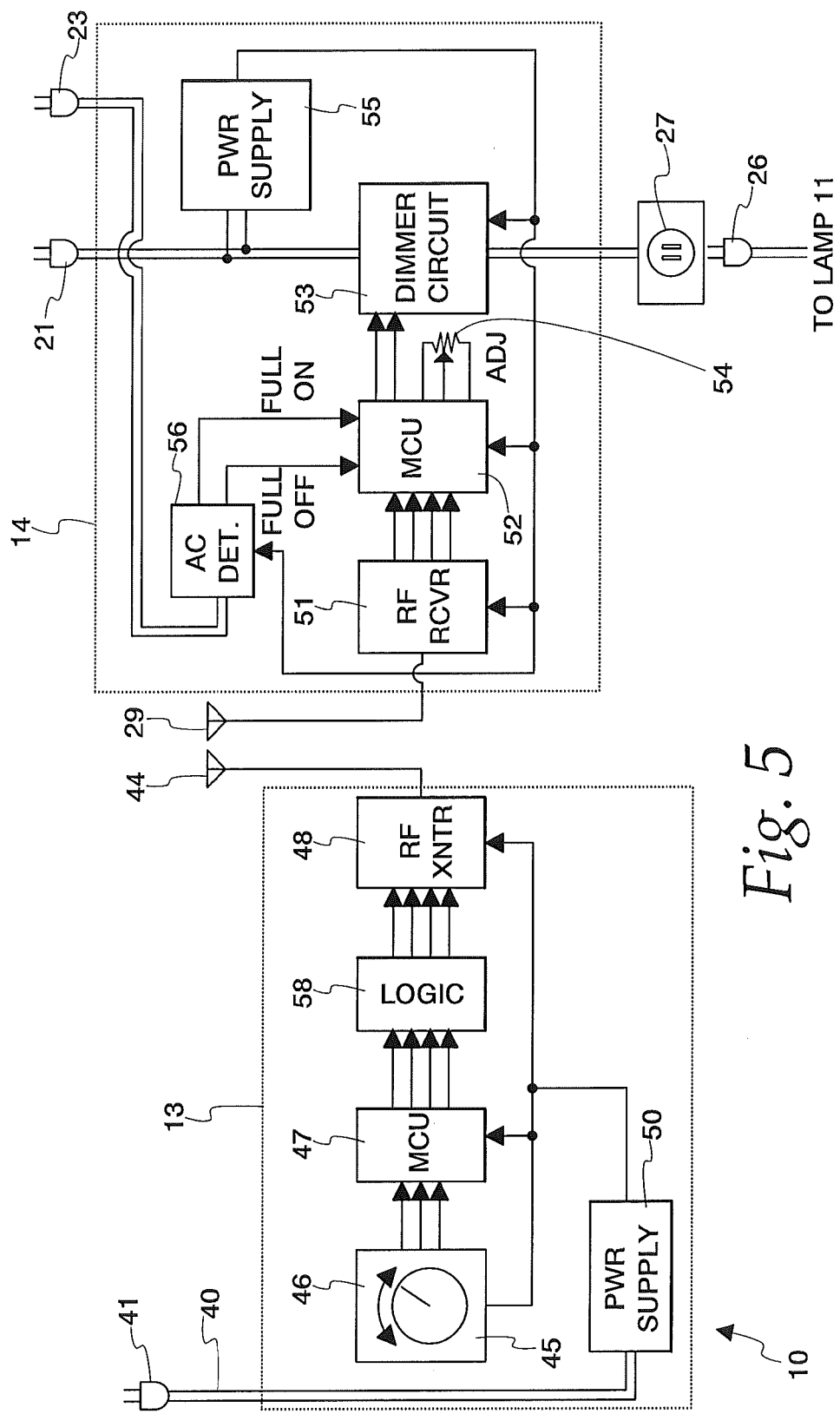
FIG. 5 is a schematic diagram, partially in functional block form, of an alternate embodiment of the lamp dimmer system of FIG. 2, wherein a steady state brightness command signal is generated at the user control module and momentarily wirelessly transmitted to the lamp control module, and wherein the lamp control module in response to the momentary command signal generates a steady signal brightness control signal which is applied to a dimmer circuit to control lamp brightness.

An alternate embodiment of the lamp control system 10 is shown in FIG. 5. In this embodiment, the quadrature output signals of rotary encoder 46 are utilized by microcontroller 47 to generate a steady state brightness command signal. This steady state brightness command signal is applied through a logic circuit 58 which causes the signal to be momentarily applied to RF transmitter 48 whenever the command signal undergoes a change. RF transmitter 48, in conjunction with antenna 44, transmits the momentary brightness command signal. Power supply 50 provides DC operating power to the components of module 13.

The transmitted RF signal is received by antenna 29 and RF receiver circuit 51. The output of receiver circuit 51 is in the form of a momentarily occurring brightness command signal which is applied to microcontroller 52, wherein a steady state brightness control signal corresponding to the momentarily occurring brightness command signal is generated. This brightness control signal is applied to dimmer circuit 53 in the manner previously described in connection with the embodiment of FIG. 2 to cause the current level supplied from AC plug 21 to table lamp 11 at receptacle 27 to be set in accordance with the brightness signal level. As previously described, AC detector circuit 56 monitors the voltage appearing on AC plug 23 to override the user-set level of the brightness control signal to either a maximum level upon actuation of wall switch 20 (FIG. 1) to on, or to a minimum level upon actuation of wall switch 20 to off. Thus, as previously described, normal operation of the lamp is obtainable by actuation of the wall switch.

A power supply 55 provides DC operating power to the components of lamp control module 14. The microcontroller 52 includes adjustment means in the form of a potentiometer 54 actuable by slot adjustment 28 (FIGS. 1 and 3) to accommodate the characteristics of various types of lamps.

Thus, the operation of the embodiment of FIG. 5 differs from the embodiment of FIG. 2 in that a steady state brightness command signal is developed at user control module 13 and momentarily transmitted in digital form to microcontroller 52, which upon receiving the signal sets the brightness control signal to a corresponding level. This is in contrast to the embodiment of FIG. 2, wherein momentary brightness increase and decrease command pulses are sent by the user control module 13 to lamp control module 14 wherein they are applied to microcontroller 52, to cause the brightness control signal developed therein to be incrementally increased or decreased with reception of the pulses.

The illustrated embodiments use a conventional rotary encoder of the type that produces a two-wire quadrature signal, such as, for example, the EVE series encoder manufactured by Panasonic Corporation. However, it will be appreciated that alternative input devices could be utilized, such as separate up and down push button switches, or a center-off momentary position rocker switch where the user depresses the switch one way to increase lamp brightness, and the other way to decrease lamp brightness. The microcontrollers utilized in user control module 13 and lamp control module 14 can be a relatively simple microcontroller, for example, the model STM85003FEP6 manufactured by ST Microelectronics. The dimmer circuit 53 can be a conventional phase-controlled triac controlled by a conventional zero-crossing circuit in conjunction with a circuit that generates a variable delay every half cycle starting at the zero-crossing point of the applied AC signal at AC plug 21. The variable delay is dependent on the level of the applied brightness control signal from microcontroller 52. When there is no delay, the lamp receives power during the full 180 degrees of each half-cycle. The more the delay is increased, the later in each half cycle the triac becomes conductive, and the less energy the lamp receives.

The RF transmitter 48 and RF receiver 51 utilized in the illustrated embodiment may be conventional in design and construction. The transmission protocol may be a subset of Zigbee, such as standard 802.15.4, and may operate in the 2.4 GHz band. While external antennas 44 and 29 have been shown, it will be appreciated that at this frequency such external antennas may not be required. Furthermore, it will be appreciated that other frequencies bands and other protocols may be utilized, or that a carrier current may be utilized on the power line instead of an RF wireless transmission. In the latter instance, power line modems of conventional design and construction may be substituted in a known manner for RF transmitter 48 and RF receiver 51 in the illustrated embodiments.

It will be further appreciated that the system can be utilized for lamp control wherein the room lights are controlled from multiple locations by multiple switches, as in the case of three-way switch circuits. Furthermore, the user control module 13 can be incorporated into a clock radio, such that the dimmer control 45 is located on the housing of the radio, and, if desired, a brightness command ramping up the brightness of the lamps can be automatically initiated by the clock radio with the occurrence of a wake-up alarm.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

I claim:

1. A lamp control system for controlling from one location one or more dimmable lamps at one or more remote locations each having access to an associated continuously powered unswitched electrical outlet and an associated selectively powered switched electrical outlet under control of at least one wall switch, comprising:
   a. A user-actuated control circuit at the one location for producing momentary lamp brightness command signals in response to the user setting a desired lamp brightness;
   b. A transmitter at the one location for transmitting said user brightness command signals;
   c. A receiver at each remote location for receiving said transmitted lamp brightness command signals;
   d. A control circuit at each remote location responsive to said lamp brightness command signals for generating a brightness control signal corresponding to said user-desired lamp brightness;
   f. A power detection circuit at each remote location connected to said switched outlet for producing a first momentary brightness override signal upon said switched outlet becoming powered, and a second momentary brightness override signal upon said switched outlet becoming unpowered;

g. Said control circuit being responsive to occurrence of said first momentary brightness override signal for resetting said brightness control signal to correspond to a predetermined maximum brightness level, and being responsive to occurrence of said second momentary brightness override signal for resetting said brightness control signal to correspond to a predetermined minimum brightness level; and h. A dimmer circuit at each remote location connected between the associated unswitched outlet and the associated lamp and responsive to said brightness control signal for setting the lamp to said user-desired brightness level, to said predetermined maximum brightness level upon closure of the wall switch, and to said predetermined minimum brightness level upon opening of the wall switch.

* * * * *